United States Patent
Sehgal et al.

(10) Patent No.: US 11,354,190 B2
(45) Date of Patent: Jun. 7, 2022

(54) USING OVER PROVISIONING SPACE FOR SELECTIVELY STORING BLOCK PARITY

(71) Applicant: Western Digital Technologies, Inc., San Jose, CA (US)

(72) Inventors: Rohit Sehgal, San Jose, CA (US); Sahil Sharma, San Jose, CA (US); Nian Niles Yang, Mountain View, CA (US); Philip David Reusswig, Santa Clara, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/184,422

(22) Filed: Feb. 24, 2021

(65) Prior Publication Data

US 2022/0050747 A1 Feb. 17, 2022

Related U.S. Application Data

(60) Provisional application No. 63/065,403, filed on Aug. 13, 2020.

(51) Int. Cl.
| | |
|---|---|
| *G06F 11/10* | (2006.01) |
| *G06F 11/07* | (2006.01) |
| *G06F 12/02* | (2006.01) |
| *G06F 11/14* | (2006.01) |

(52) U.S. Cl.
CPC ........ *G06F 11/1068* (2013.01); *G06F 11/076* (2013.01); *G06F 11/0772* (2013.01); *G06F 11/1489* (2013.01); *G06F 12/0246* (2013.01)

(58) Field of Classification Search
CPC ............... G06F 11/1068; G06F 11/076; G06F 11/0772; G06F 11/1489; G06F 12/0246
USPC ....... 714/764, 766, 768, 769, 770, 773, 799, 714/800
See application file for complete search history.

(56) References Cited

U.S. PATENT DOCUMENTS

| | | | |
|---|---|---|---|
| 8,479,080 B1 * | 7/2013 | Shalvi .................. | G06F 3/0688 714/766 |
| 8,601,311 B2 | 12/2013 | Horn | |
| 8,862,804 B2 | 10/2014 | Horn | |
| 9,158,700 B2 | 10/2015 | Goss et al. | |
| 9,342,260 B2 | 5/2016 | Schuette et al. | |
| 9,348,695 B2 | 5/2016 | Sharon et al. | |

(Continued)

*Primary Examiner* — John J Tabone, Jr.
(74) *Attorney, Agent, or Firm* — Loza & Loza, LLP; Gabriel Fitch

(57) ABSTRACT

Methods and apparatus for storing parity bits in an available over provisioning (OP) space to recover data lost from an entire memory block. For example, a data storage device may receive data from a host device, write the data to a block, and generate a corresponding block parity. The device may then determine a bit error rate (BER) of the block and an average programming duration to write the data written to the block, calculate a probability of the block becoming defective based on the BER and the average programming duration, and comparing the probability of the block to a set of probabilities respectively corresponding to a set of worst-performing blocks in a NVM. Thereafter, the device may write the block parity to an available over provisioning (OP) space in the NVM responsive to the probability of the block being greater than any probability in the set of probabilities.

20 Claims, 9 Drawing Sheets

(56) References Cited

U.S. PATENT DOCUMENTS

| | | | |
|---|---|---|---|
| 9,558,107 B2* | 1/2017 | Camp | G06F 3/0614 |
| 9,619,326 B2 | 4/2017 | Singhai et al. | |
| 9,619,381 B2* | 4/2017 | Camp | G06F 12/0246 |
| 9,864,525 B2 | 1/2018 | Kankani et al. | |
| 9,898,215 B2 | 2/2018 | Camp et al. | |
| 10,120,751 B2 | 11/2018 | Khan et al. | |
| 10,284,231 B2* | 5/2019 | Canepa | H03M 13/29 |
| 10,338,841 B2 | 7/2019 | Kathawala et al. | |
| 10,496,472 B2 | 12/2019 | Gopalakrishnan | |
| 11,049,009 B2* | 6/2021 | Shulkin | G06F 3/0679 |
| 2014/0122787 A1* | 5/2014 | Shalvi | G06F 3/0688 |
| | | | 711/113 |
| 2015/0177995 A1* | 6/2015 | Camp | G06F 11/1048 |
| | | | 711/103 |
| 2015/0178191 A1* | 6/2015 | Camp | G06F 12/0246 |
| | | | 711/103 |
| 2016/0034206 A1* | 2/2016 | Ryan | G06F 3/0605 |
| | | | 711/103 |
| 2017/0084322 A1* | 3/2017 | Wang | G11C 7/065 |
| 2017/0364298 A1* | 12/2017 | Choi | G06F 11/079 |
| 2018/0357535 A1* | 12/2018 | Shulkin | G11C 16/28 |
| 2019/0304562 A1 | 10/2019 | Cai et al. | |
| 2020/0057578 A1 | 2/2020 | Benisty et al. | |

* cited by examiner

| BLOCK NUMBER | FAILED BIT COUNT (FBC) | PROGRAMMING TIME (µs) | RANK |
|---|---|---|---|
| 0 | 25 | 350 | 2 |
| 1 | 27 | 360 | 3 |
| 2 | 50 | 400 | 5 |
| 3 | 32 | 360 | 4 |
| 4 | 10 | 340 | 1 |
| 5 | 22 | 330 | 0 |

| XOR ZONE | PAGE | XRAM | | FULL BLOCK PARITY |
|---|---|---|---|---|
| | | | 402 | 404 |
| 0 | 0 | 0: 0 | 24: 0 | 0*: 0 + 24 |
| | 24 | 0': 0 + 24 | 24': 0 + 24 | 24*: 0' + 24' |
| | 48 | 0'': 0 + 24 + 48 | 24'': 0 + 24 + 48 | 48*: 0'' + 24'' |
| | ... | ... | ... | ... |
| | 264 | 0'$^{x12}$: 0 + 24 + ... + 264 | 24'$^{x12}$: 0 + 24 + ... + 264 | 264*: 0'$^{x12}$ + 24'$^{x12}$ |
| 1 | 288 | 0: 288 | 24: 288 | 288*: 0 + 24 |
| | 312 | 0': 288 + 312 | 24': 288 + 312 | 312*: 0' + 24' |
| | ... | ... | ... | ... |

USING OVER PROVISIONING SPACE FOR SELECTIVELY STORING BLOCK PARITY

CROSS-REFERENCE TO RELATED APPLICATIONS

This application claims priority to and the benefit of U.S. Provisional Patent Application No. 63/065,403, filed on Aug. 13, 2020 entitled, "USING OVER PROVISIONING SPACE FOR SELECTIVELY STORING BLOCK PARITY," the entire content of which is incorporated herein by reference.

FIELD

The subject matter described herein relates to data storage devices and controllers. More particularly, the subject matter relates, in some examples, to the storing of parity bits in an available over provisioning (OP) space of a non-volatile memory to recover data lost from an entire memory block.

INTRODUCTION

Over provisioning (OP), in a storage context, refers to the inclusion of extra storage capacity in a data storage device, such as a solid state device (SSD). OP can increase the endurance of the SSD by distributing a total number of writes and erases across a larger population of blocks and pages over time. OP can also improve performance by giving a flash controller additional buffer space for managing program/erase (P/E) cycles and improving the probability that a write operation will have immediate access to a pre-erased block. The extra capacity may not be visible to a host as available storage.

To maintain consistent performance across data storage devices with enterprise workloads, an OP space of data storage devices with very high performance may be reduced from a host point of view so that a variation in performance across the data storage devices is not more than a predetermined threshold (e.g., 10%). This will ensure that the storage devices are not overly dissimilar from each other in terms of performance and quality of service (QoS) requirements.

However, when the OP space is reduced in a storage device that is performing well (e.g., the best) among other storage devices, the well-performing storage device is penalized by the reduction of OP space without reaping any benefits in return. Accordingly, it would be helpful to provide improvements within data storage devices in connection with over provisioning to make use of the OP space on well-performing storage devices, such as to store full block XOR parity to recover data whenever there is data loss corresponding to such blocks in a system. This improves the life of the storage device and provides ways in which the system helps recover the data from a full block failure after a block has been closed (i.e., after all wordlines (WLs) of the block have been written to).

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a method for use with a data storage device including a non-volatile memory (NVM) and a volatile memory. The method includes: receiving data from a host device; writing the data to a block in the NVM and generating a corresponding block parity; determining a bit error rate (BER) of the block and an average programming duration to write the data written to the block; calculating a probability of the block becoming defective based on the BER and the average programming duration; comparing the probability of the block to a set of probabilities respectively corresponding to a set of worst-performing blocks in the NVM; and writing the block parity to an available over provisioning (OP) space in the NVM responsive to the probability of the block being greater than any probability in the set of probabilities.

Another embodiment of the disclosure provides a data storage device that includes: a non-volatile memory (NVM); a volatile memory; and a data storage controller. The data storage controller is configured to: receive data from a host device, write the data to a block in the NVM and generate a corresponding block parity, determine a bit error rate (BER) of the block and an average programming duration to write the data written to the block, calculate a probability of the block becoming defective based on the BER and the average programming duration, compare the probability of the block to a set of probabilities respectively corresponding to a set of worst-performing blocks in the NVM, and write the block parity to an available over provisioning (OP) space in the NVM responsive to the probability of the block being greater than any probability in the set of probabilities.

Yet another embodiment of the disclosure provides an apparatus for use with a non-volatile memory (NVM) and a volatile memory. The apparatus includes: means for writing the data to a block in the NVM and generating a corresponding block parity; means for determining a bit error rate (BER) of the block and an average programming duration to write the data written to the block; means for calculating a probability of the block becoming defective based on the BER and the average programming duration; means for comparing the probability of the block to a set of probabilities respectively corresponding to a set of worst-performing blocks in the NVM; and means for writing the block parity to an available over provisioning (OP) space in the NVM responsive to the probability of the block being greater than any probability in the set of probabilities.

BRIEF DESCRIPTION OF THE DRAWINGS

FIG. 2 is a block rank table depicting an example ranking of (jumbo) blocks in a system in accordance with some aspects of the disclosure.

FIG. 3 is a diagram showing a portion of a jumbo block and how parity bits are stored to protect against a failure (data loss) of up to two wordlines (WLs) in accordance with some aspects of the disclosure.

FIG. 4 is a table depicting how parity bits for an entire block (full block parity) are generated in accordance with some aspects of the disclosure.

DETAILED DESCRIPTION

Figure 1:
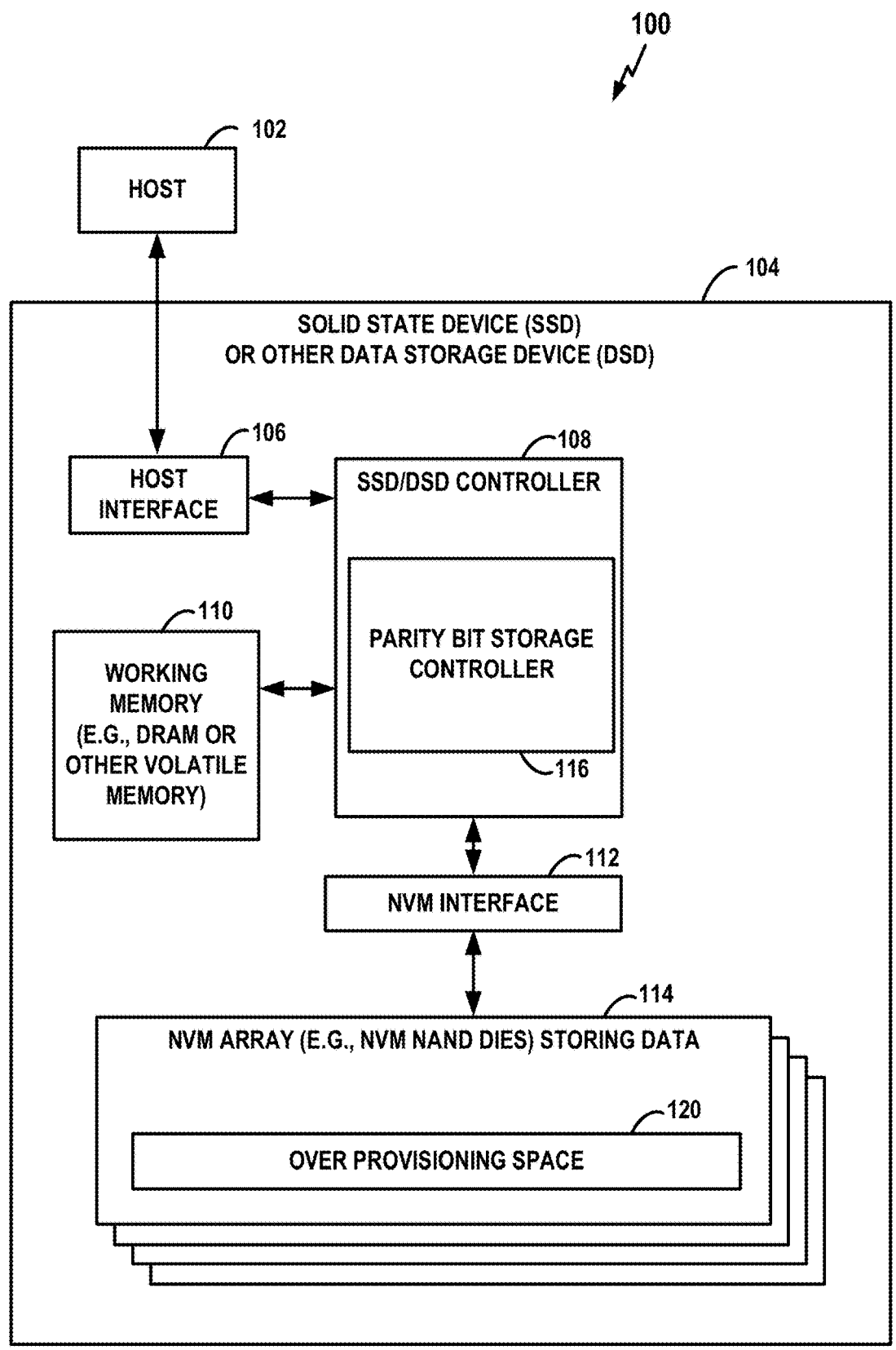
FIG. 1 is a schematic block diagram illustrating a data storage device in the form of an exemplary data storage device (DSD) including an NVM array and a processor configured for storing parity bits in an available over provisioning (OP) space of the NVM array to recover data lost from a block stored in the NVM array in accordance with some aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to data storage devices (DSDs) and to data storage controllers of the DSDs. In the main examples described herein, data is stored within non-volatile memory (NVM) arrays. In other examples, data may be stored in hard disk drives (HDD). DSDs with NVM arrays may be referred to as solid state devices (SSDs). Some SSDs use NAND flash memory, herein referred to as "NANDs." A NAND is a type of non-volatile storage technology that does not require power to retain data. It exploits negative-AND, i.e. NAND, logic. For the sake of brevity, an SSD having one or more NAND dies will be used as a non-limiting example of a DSD below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

Overview

Aspects of the disclosure relate to accumulating full block XOR parity bits for a set of worst-performing blocks (e.g. highest bit error rate (BER) blocks) that have a high probability of failing in a system, storing the accumulated full block XOR parity bits in an over provisioning (OP) space of a non-volatile memory, and restoring data lost from a block based on the stored full block XOR parity bits. The number of blocks for which the full block XOR parity bits are stored depends on the amount of OP space available in the non-volatile memory that is not used. Moreover, in some embodiments, the amount of OP space available is allocated only from an OP space of good drives, where a good drive is a drive that is performing better (e.g., on average) than other drives in an array of drives by a predetermined amount, such as 10%.

Herein, methods and apparatus are disclosed for storing parity bits in an available over provisioning (OP) space of a non-volatile memory (NVM) to recover data lost from an entire memory block. Briefly, in some examples, a data storage device may receive data from a host device, write the data to a block in the NVM, and generate a corresponding block parity. The device may then determine a bit error rate (BER) of the block and an average programming duration to write the data written to the block, calculate a probability of the block becoming defective based on the BER and the average programming duration, and compare the probability of the block to a set of probabilities respectively corresponding to a set of worst-performing blocks in the NVM. Thereafter, the device may write the block parity to an available over provisioning (OP) space in the NVM responsive to the probability of the block being greater than any probability in the set of probabilities.

Exemplary Devices, Systems and Procedures

FIG. 1 is a block diagram of a system 100 including an exemplary SSD configured for storing parity bits in an available over provisioning (OP) space of a non-volatile memory to recover data lost from an entire memory block in accordance with aspects of the disclosure. The system 100 includes a host 102 and an SSD 104 (or other DSD, but for simplicity referred to as an SSD below) coupled to the host 102. The host 102 provides commands to the SSD 104 for transferring data between the host 102 and the SSD 104. For example, the host 102 may provide a write command to the SSD 104 for writing data to the SSD 104 or read command to the SSD 104 for reading data from the SSD 104. The host 102 may be any system or device having a need for data storage or retrieval and a compatible interface for communicating with the SSD 104. For example, the host 102 may be a computing device, a personal computer, a portable computer, a workstation, a server, a personal digital assistant, a digital camera, or a digital phone as merely a few examples.

The SSD 104 includes a host interface 106, an SSD or DSD controller 108, a working memory 110 (such as DRAM or other volatile memory), an NVM interface 112 (e.g., flash interface module (FIM)), and an NVM array 114 having one or more dies storing data. The host interface 106 is coupled to the controller 108 and facilitates communication between the host 102 and the controller 108. The controller 108 is coupled to the volatile memory 110 as well as to the NVM array 114 via the NVM interface 112. The host interface 106 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link. The NVM array 114 may include multiple dies. Furthermore, the one or more dies of the NVM array 114 may include an over provisioning (OP) space (OP blocks) 120 configured to store parity bits corresponding to data written to an entire jumbo block (e.g., all wordlines of the jumbo block) of the NVM array 114. In an aspect, the jumbo block may include any number of meta-blocks (e.g., 8 meta-blocks), where each meta-block includes any number of physical blocks (e.g., 8 physical blocks) and each physical block includes 96 wordlines.

Hence, in some examples, the host may be a laptop computer with an internal SSD and a user of the laptop may wish to playback video stored by the SSD. In another example, the host again may be a laptop computer, but the video is stored by a remote server.

Although, in the example illustrated in FIG. 1, SSD 104 includes a single channel between controller 108 and NVM array 114 via interface 112, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 108 may be implemented in a single integrated circuit chip and may communicate with different layers of memory in the NVM 114 over one or more command channels.

The controller 108 controls operation of the SSD 104. In various aspects, the controller 108 receives commands from the host 102 through the host interface 106 and performs the commands to transfer data between the host 102 and the NVM array 114. Furthermore, the controller 108 may manage reading from and writing to volatile memory 110 for performing the various functions effected by the controller and to maintain and manage cached information stored in the volatile memory 110.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, application specific integrated circuit (ASIC), or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The working memory 110 may be any suitable memory, computing device, or system capable of storing data. For example, working volatile memory 110 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the working memory 110, or a portion thereof, to store data during the transfer of data between the host 102 and the NVM array 114. For example, the working memory 110 or a portion of the volatile memory 110 may be a cache memory. The NVM array 114 receives data from the controller 108 via the NVM interface 112 and stores the data. In some embodiments, working memory 110 may be replaced by a non-volatile memory such as MRAM, PCM, ReRAM, etc. to serve as a working memory for the overall device.

In the example of FIG. 1, the controller 108 may include hardware, firmware, software, or any combinations thereof that provide a parity bit storage controller 116. For example, the parity bit storage controller 116 may be configured to accumulate, in a volatile working memory 110, parity bits corresponding to data written to wordlines of a memory block (e.g., all wordlines of a jumbo memory block) and write the accumulated parity bits from the volatile working memory 110 to an available over provisioning (OP) space 120 in the NVM array 114 when the probability of the jumbo block manifesting a defect (e.g., becoming defective) is greater than a probability of one of the worst performing blocks in the NVM array 114 manifesting a defect.

Although FIG. 1 shows an exemplary SSD and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components. As another example, the SSD controller 108 may be a controller in another type of device and still be configured to perform or control the accumulation of parity bits corresponding to data written to a memory block of the NVM array and the writing of the parity bits to an available OP space in the NVM array, and perform some or all of the other functions described herein.

In order to protect data from NAND defects, a system firmware may maintain XOR parity bits by dividing the data into multiple bins. Based on an amount of protection needed for data loss, a total number of unique XOR bins may be determined during an algorithm design phase. In an aspect, the NAND defects may include a wordline-wordline (WL-WL) short, a wordline-memory hole (WL-MH) short, a program failure, or any other silent NAND defect. A silent NAND defect may be defined as a type of defect that does not manifest itself during data programming, and thus, no evidence of the defect may exist. This is true even though the defect has already been generated. Normally, when a defect occurs, a NAND program or erase operation will time out and a status failure will be reported by the NAND. However, in the case of the silent NAND defect, the status reported by the NAND will be good since no evidence of the defect exists. As such, when the NAND is later accessed to perform a read operation, the read operation will fail and data loss will occur. In one aspect, the silent NAND defect can also refer to a defect that manifests once, but is not repeatable.

In some aspects, an XOR scheme may be designed to protect open blocks (i.e., blocks that have not been fully written to) such that all wordlines (WLs) of an open block can be recovered in the event that a program failure (PF) initiates a wordline-local interconnect (WL-Li) short corrupting data written to the open block previously committed to a host. The XOR scheme may make use of DRAM to store open block parity bits for an entire addressable user data page (e.g., a jumbo page spread across multiple meta-blocks). Once the block is closed (e.g., all WLs of the block have been written to), then the DRAM parity bits corresponding to the block may be released (e.g., stored somewhere for a later recovery).

When the block is closed, a subset of the parity bits may be stored in the flash memory (NAND). However, the subset of the parity bits may not be sufficient to recover the data from a full block data loss. Therefore, if the block is closed and the NAND experiences a WL-Li short causing a full block data loss, a system that does not implement one or more of the techniques described herein may not be able to recover the data.

In a current XOR scheme (e.g., that does not implement one or more of the techniques described herein), a system may only recover data when there exists a WL-WL short as the number of XOR bins determined during a design phase of the XOR scheme may only protect against the failure of up to two WLs. Thus, if failure occurs on more than two WLs on a closed block, the current XOR scheme inherently fails.

In order to protect an entire block (e.g., having 96 WLs), XOR parity bits of all WLs written to the block may be accumulated and stored (e.g., in non-volatile memory). However, this may require extra space on the storage device as XOR parity bits may be accumulated for all of the WLs in a jumbo block. The jumbo block may comprise multiple meta-blocks (MBs) (e.g., 8 MBs), wherein each MB may comprise multiple physical blocks and each physical block may comprise multiple WLs (e.g., 96 WLs). Moreover, the physical blocks may span different unique back-end controller flash interface modules (FIMs). In an example implementation, 8 physical blocks are included in one MB, 8 MBs are included in one jumbo block, and parity bits may be stored as a set corresponding to one jumbo block.

In the event a failure (data loss) occurs on any particular page of a WL on a physical block of a particular FIM, an XOR parity bin number corresponding to the failing page/WL on which the data loss occurs can be identified by firmware. Subsequently, XOR parity bits stored in the flash memory (NAND) corresponding to the bin number are read and a de-XOR operation can be performed on all pages that have the same XOR parity bin number as the failing page. At the end of the de-XOR operation, the data is recovered on the failing page and the entire physical block may be marked for scrub or retirement after moving the valid data to a new block.

However, as stated above, a design of the current XOR parity scheme may only support protection of up to two WLs, e.g., due to a limitation in the amount of available space for storing parity bits. As such, if a silent failure occurs on the storage device that leads to data loss on more than 2 WLs, then the design of the current XOR parity scheme may not be helpful in recovering the lost data unless the XOR parity bits for an entire block are saved in the flash memory.

Over Provisioning

Over provisioning (OP) refers to the inclusion of extra storage capacity (OP space) in a data storage device (e.g., SSD). OP can increase the endurance of the storage device by distributing a total number of writes and erases across a larger population of NAND flash blocks and pages over time, and can improve performance by giving a flash controller additional buffer space for managing program/erase (P/E) cycles and improving the probability that a write operation will have immediate access to a pre-erased block. In some aspects, the OP space of a data storage device with very high performance may be reduced from a host point of view to maintain consistent performance across data storage devices with enterprise workloads. For example, the OP space of the data storage device(s) may be reduced so that a variation in performance across the data storage devices is not more than a predetermined threshold (e.g., 10%). This may ensure that the storage devices are not overly dissimilar from each other in terms of performance and quality of service (QoS) requirements for a specific implementation.

In an aspect, when some OP space in a data storage device is unutilized to lessen performance variation across a group of data storage devices, the extra OP space may be repurposed to store XOR parity bits. For example, the extra OP space may store XOR parity bits corresponding to an entire block (full block) for a select number of blocks in a system. The select blocks may be blocks that consistently show a very high bit error rate (BER) and are determined to have a degraded/degrading block health. At any given point, a total number of blocks for which XOR parity bits corresponding to a full block can be stored may depend on an amount of extra OP space left in the data storage device after budgeting of the OP space has been performed based on storage device OP requirements.

In an aspect, the data storage device may be configured to capture a programming time (e.g., programming duration) and a failed bit count (FBC)/BER of each WL at production and/or during a runtime operation of the storage device. After a manufacturing self-test (MST) during production, blocks may be ranked based on the average programming time of the WLs in a block and the BER/FBC of the block. The average programming time, the BER/FBC, and the block rank may be recorded in a block rank table in the flash memory (NAND), which the firmware can make use of during the runtime operation of the storage device. The block rank table may be updated at regular intervals or when a garbage collection mechanism is triggered during the runtime operation of the storage device. Moreover, the block rank table may help the firmware decide an order for selecting blocks and a mechanism in which the blocks are to be programmed (e.g., X1, X2, X3, or X4).

FIG. 2 illustrates a block rank table 200 depicting an example ranking of (jumbo) blocks in a system. A block's rank may indicate a probability of the block manifesting a defect (e.g., at a later time) that causes a loss of data on the block. In an aspect, ranks of all blocks in the system may be determined based on a programming time and a failed bit count (FBC) (or BER) of each block. The FBC of a block may be equivalent to an average FBC of all WLs in the block. As such, the FBC of the block may be calculated as follows:

$$FBC_{BLOCK} = (FBC \text{ of all } WLs \text{ in block})/(\text{total number of } WLs \text{ in block}).$$

As shown in the table 200, the six worst-performing blocks (e.g., Block 0, Block 1, Block 2, Block 3, Block 4, and Block 5) in the system are listed. After a manufacturing self-test (MST) during production, the blocks may be ranked based on some combination of their programming time and FBC. For example, Block 0 is tested to have a FBC of 25 and a programming time of 350 μs; Block 1 is tested to have a FBC of 27 and a programming time of 360 μs; Block 2 is tested to have a FBC of 50 and programming time of 400 μs; Block 3 is tested to have a FBC of 32 and a programming time of 360 μs; Block 4 is tested to have a FBC of 10 and a programming time of 340 μs; and Block 5 is tested to have a FBC of 22 and a programming time of 330 μs. Accordingly, based on the test results, the blocks may be ranked as follows: Block 0-Rank 2; Block 1-Rank 3; Block 2-Rank 5; Block 3-Rank 4; Block 4-Rank 1; Block 5-Rank 0. In an aspect, at production time, depending on the OP space available, the firmware may determine the extra OP blocks that can be used to store full block XOR parity bits. In a further aspect, weights may be assigned to the FBC and the programming time. For example, more weight can be assigned to the FBC (e.g., 70%) than the programming time (e.g., 30%) when determining the ranks. As such, a block's rank may be based on a combination of 70% FBC and 30% programming time. However, in general, the block's rank may be determined based on any weighted combination of FBC and programming time.

In an aspect, during a runtime of the storage device, the firmware may discover/determine an additional block (e.g., seventh block) (not listed) that performs worse than at least one of the blocks listed in the table 200. Accordingly, the firmware may replace one of the previously-listed blocks in the table 200 with the discovered additional block.

In an example operation, at any given point in time, as the firmware starts to fill blocks with data, the firmware may determine a preselected number of the worst-performing blocks out of all blocks that are currently programmed/stored in the system or data storage device (e.g., 6 worst-performing blocks listed in the table 200) and store XOR parity bits corresponding to the data written to these blocks in an available OP space (OP block) of a non-volatile memory. Prior to the closure of a seventh block, and before data and parity bits corresponding to the seventh block are released, the firmware may determine if the seventh block performs worse than any of the number of worst-performing blocks. If the seventh block is determined to perform worse, then the firmware may write to (e.g., store in) the available OP space (OP block), parity bits corresponding to the seventh block that are located in a volatile memory (e.g., DRAM) or non-OP space of the non-volatile memory (e.g., flash memory). The firmware may further maintain a mapping to the location in the OP space where the XOR parity bits are stored/written. For the block that is evicted from the table 200 (e.g., replaced by the seventh block), the firmware will no longer need the parity bits for the evicted block. The firmware may mark in the table 200 that the parity bits for such block are no longer needed or valid. Thus, the firmware may add one block and omit one block from the table 200 during operation of the data storage device.

In an aspect, the amount of available OP space for storing XOR parity bits may be determined during production (e.g., manufacturing) of the data storage device. For example, during production, a number of good-performing blocks in a system may be detected (e.g., identified). An available OP space may be determined based on the number of good-performing blocks detected. Moreover, a file system in the data storage device may be built in such a way to inform the firmware of how many blocks, spaces, and/or slots in a non-volatile memory can be used to accommodate the XOR parity bits of the worst-performing blocks. Thus, at the time of production, the amount of available OP space can be determined as well as the number of worst-performing blocks for which the firmware can store XOR parity bits in the OP space.

Figure 3:
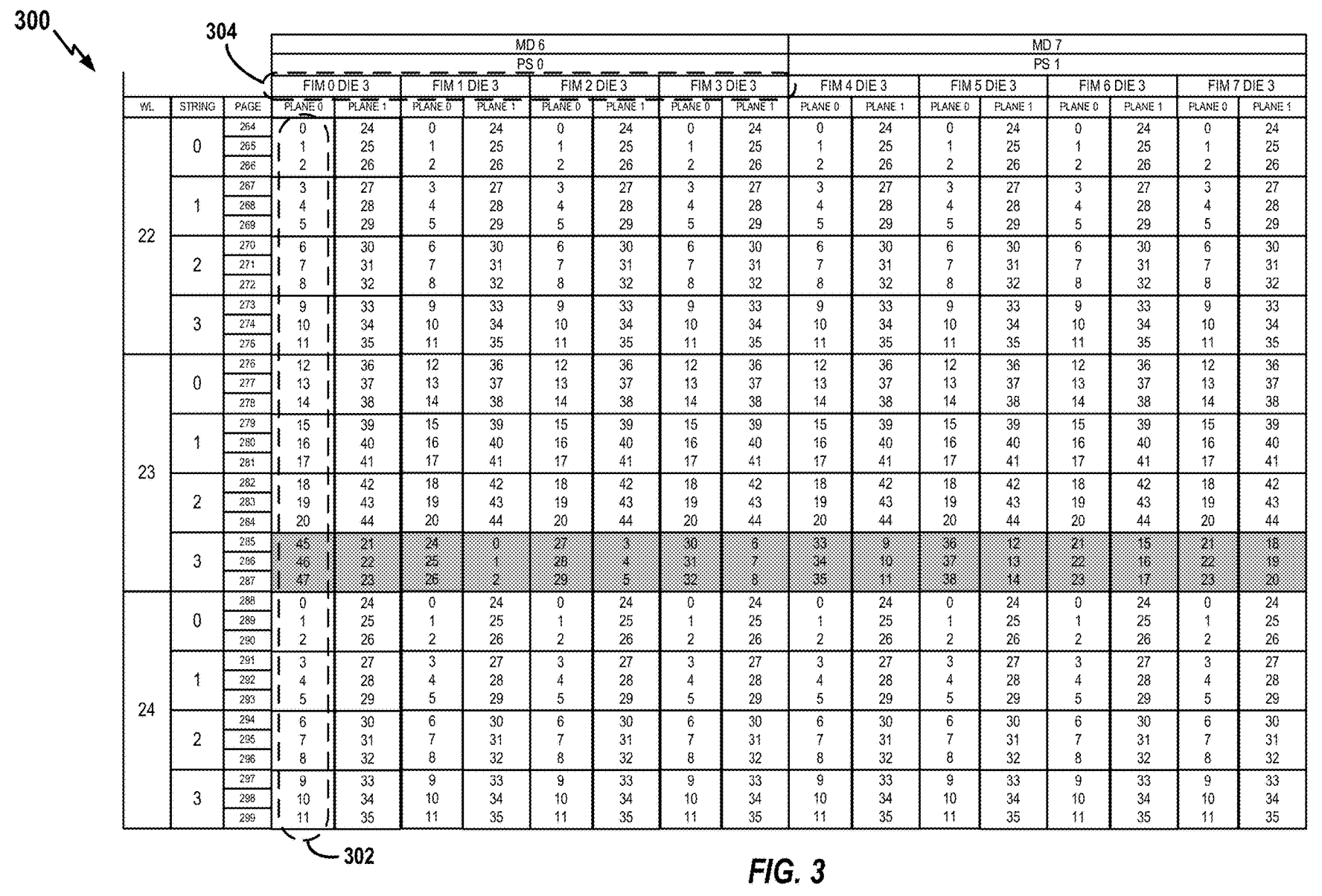

FIG. 3 is a diagram 300 showing a portion of a jumbo block and how parity bits are stored to protect against a failure (data loss) of up to two wordlines (WLs). In particular, the diagram 300 depicts one of four zones in an XOR parity scheme where accumulated parity bits are stored. In an aspect, XOR parity bits for an entire jumbo block are accumulated in XRAM. Once the jumbo block is closed (i.e., all wordlines of the jumbo block are written to), the accumulated XOR parity bits are stored in flash memory for all bins denoted in gray in the diagram 300. However, the parity bits stored according to the XOR parity scheme depicted in FIG. 3 may not be helpful in recovering data from a full physical block failure.

In FIG. 3, flash interface module (FIM) 0, FIM 1, FIM 2, FIM3, FIM 4, FIM 5, FIM 6, and FIM 7 are channels from a control point of view. A number of physical blocks 302 may be grouped together across FIMs to form a meta-block 304. For example, one physical block 302 may include 96 wordlines. One meta-block 304 may include eight physical blocks 302. Eight meta-blocks 304 may be grouped together to form the jumbo block. A meta-die (MD) is a group of four physical dies across four FIMs, wherein each physical die includes two physical blocks across two planes (plane 0 and plane 1). As shown in FIG. 3, MD 6 includes FIM 0 Die 3, FIM 1 Die 3, FIM 2 Die 3, and FIM 4 Die 3, wherein each physical die (FIM Die) includes two physical blocks 302 across plane 0 and plane 1. Moreover, MD 7 includes FIM 4 Die 3, FIM 5 Die 3, FIM 6 Die 3, and FIM 7 Die 3, wherein each physical die (FIM Die) includes two physical blocks 302 across plane 0 and plane 1. Notably, although FIG. 3 only shows three wordlines (e.g., WL 22, WL 23, and WL 24) for the physical block 302, it is contemplated that the physical block 302 includes 96 wordlines.

In an aspect, when the firmware writes data to the flash memory, the data is written simultaneously (sequentially) across the meta-block. The parallelization of all FIMs working at the same time optimizes performance. In a further aspect, XOR parity bits may be accumulated across jumbo blocks. A jumbo wordline is a wordline that may span across a jumbo block. That is, a jumbo wordline may span across an entire row from FIM 0 to FIM 7 (across FIM Dies including plane 0 and plane 1).

In an aspect, when data is lost on one physical block (e.g., physical block 302), the data may be lost on each wordline of the 96 wordlines of the physical block. The lost data may be recovered by performing an XOR operation (or de-XOR operation) using accumulated XOR parity bits.

FIG. 4 illustrates a table 400 depicting how parity bits for an entire block (full block parity) are generated. In an aspect, full block parity 404 for each jumbo page is accumulated and then stored in a volatile memory (DRAM). Once the block is closed, the accumulated full block parity 404 (for high BER blocks) may be written to a non-volatile memory (flash memory) (e.g., in available OP space/blocks of the flash memory). Therefore, if a failure event occurs for any of the high BER blocks, the full block parity stored in the non-volatile memory can be used to perform an XOR operation (e.g., unroll process) to recover the data lost on the block due to the failure.

In an aspect, extra space needed in the non-volatile memory to store the parity bits may be calculated as follows: 16 KB (per physical page)*1152 (total number of pages in the TLC block) 18 MB (TLC block size). Notably, the total number of pages in the TLC block may be calculated as follows: 4 strings*96 wordlines*3 pages/string=1152 pages. Therefore, depending on the extra OP space available (amount of OP blocks not used) in the non-volatile memory, the OP blocks can be allocated to store the full block parity of a number of the worst-performing blocks (e.g., 6 worst-ranked blocks) in the system at any given time during its operation.

As shown in FIG. 4, parity bits for page 0, page 24, page 48, etc. are accumulated in XRAM 402. Once all parity bits are accumulated for all pages/bins, XOR parity bits may be accumulated for an entire block (full block parity) 404 and stored in DRAM. For example, the XRAM 402 accumulates parity bits for all blocks that are open when data is written to different pages of a particular jumbo block. Subsequently, the DRAM accumulates the full block parity 404 by performing an XOR operation on the data from the XRAM 402.

Figure 5:
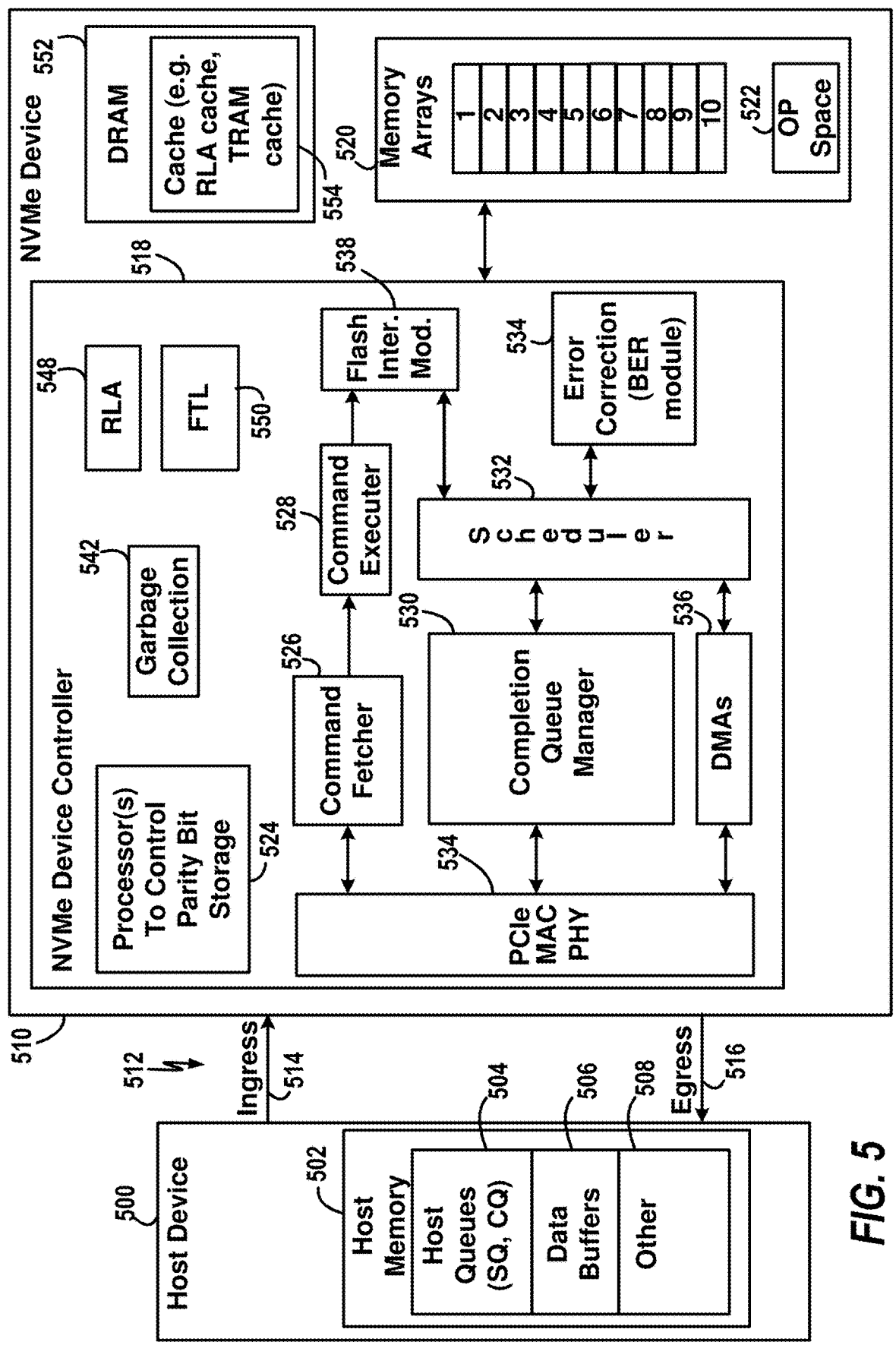
FIG. 5 is a schematic block diagram illustrating an exemplary system with a Non-Volatile Memory express (NVMe) device controller configured to store parity bits in an available over provisioning (OP) space of an NVM to recover data lost from a block stored in an NVM array in accordance with some aspects of the disclosure.

FIG. 5 illustrates certain features of an exemplary NVMe architecture in which the systems and procedures for storing parity bits in an available over provisioning (OP) space of a non-volatile memory to recover data lost from an entire memory block may be implemented.

In FIG. 5, a host device 500 may be any suitable computing or processing platform capable of accessing memory on an NVM data storage device to write data using NVMe procedures. The host device 500 includes internal memory 502, which in this example is dynamic random access memory (DRAM). The host memory 502 may be configured to include, as shown, various host submission queues (SQs) and completion queues (CQs) 504, data buffers 506 and other memory components 508. The host device 500 may store data in an NVMe storage device 510. The NVMe device 510 may be any suitable device that provides non-volatile memory storage for host device 500 in accordance with NVMe standards. For example, the NVMe device 510 may be a removable storage device, such as a flash SSD that is removably connectable to host device 500. In another example, the NVMe device 510 may be non-removable or integrated within the host device 500. In some embodiments, the host device 500 and the NVMe device 510 are communicatively connected via a PCIe bus 512 (including ingress 514 and egress 516).

The NVMe storage device 510 of FIG. 5 includes an NVMe controller 518 and a non-volatile memory 520. One or more dies of the non-volatile memory 520 may include an over provisioning (OP) space (OP blocks) 522 configured to store parity bits corresponding to data written to an entire jumbo block (e.g., all wordlines of the jumbo block) of the non-volatile memory 520. The NVMe controller 518 controls access to the non-volatile memory 520 such as a NAND. The NVMe controller 518 thus may be a non-volatile memory controller that implements or supports the NVMe protocol, and non-volatile memory 520 may be 2D or 3D NAND flash memory. The NVMe controller includes one or more processors 524 configured to control parity bit storage. The processor(s) 524 are also responsible for the execution of other Frond-End and Back-End tasks.

In use, a command fetcher 526 of the NVMe controller 518 fetches commands, such as read requests for data, from the submission queues within the host memory 502 and forwards the commands to a command executer 528. The command fetcher 526 is responsible for fetching and parsing the commands from the host and queuing them internally and may form part of a front end of the NVMe controller 518. The command executer 528 is responsible for the arbitrating and executing the commands. Upon completion of the commands, the NVMe controller 518 generates completion entries that are ultimately directed to the completion queues within the host memory 502. A completion queue manager 530 is responsible for managing the host completion queues. Among other functions, the completion queue manager 530 routes completion entries received from a scheduler 532 to a completion queue within the host device 500 via a PCIe MAC PHY interface 534.

Actual streams of data (obtained as the result of read commands applied to the NVM memory arrays 520) are delivered to the host device 500 using one or more DMAs 536. Additional components of the NVMe controller 518 shown in FIG. 5 include a flash interface module (FIM) 538, which is responsible for controlling and accessing the memory arrays 520, and an ECC component 540, which includes a bit error rate (BER) module.

Additional components of the NVMe controller 518 include: a garbage collection module 542 for controlling garbage collection and related tasks; a read look ahead (RLA) controller 548; and an FTL 550. Note that some of these components may be part of the flash interface module 538 but are shown separately for the sake of completeness and convenience. The NVMe storage device 510 may additionally include a DRAM 552 (or other working memory), which may include a cache 554, which may include portions devoted to storing parity bits.

Figure 6:
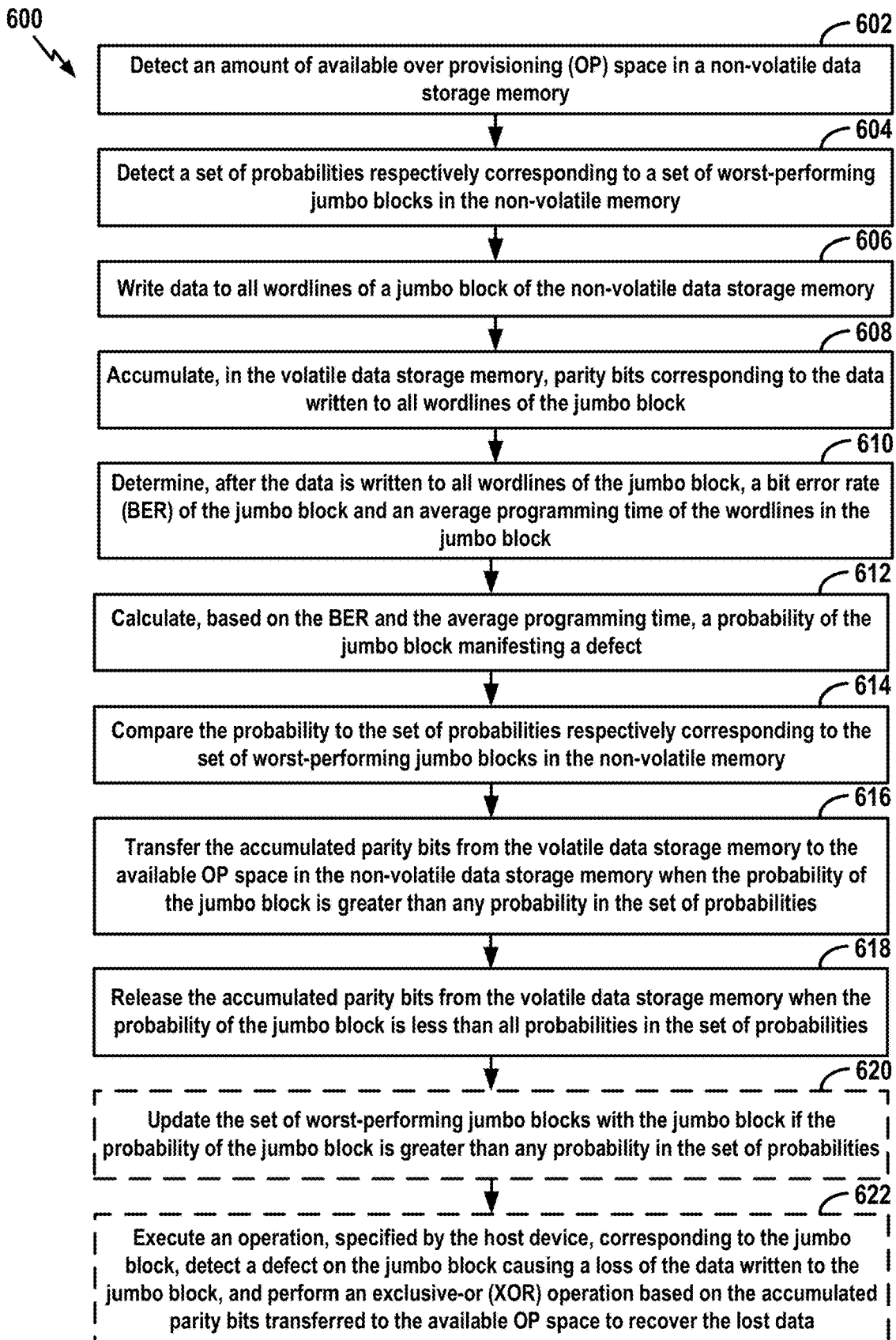
FIG. 6 illustrates an exemplary data recovery procedure that may be performed by a controller of a data storage device (DSD) in accordance with some aspects of the disclosure.

FIG. 6 illustrates an example data recovery procedure 600 that may be performed by a controller of a data storage device (DSD), such as the SSD/DSD controller 108 of FIG. 1, or the NVMe controller 518 of FIG. 5, or any other suitably-equipped device controller. At 602, the controller detects an amount of available over provisioning (OP) space in a non-volatile data storage memory (e.g., NVM array 114 or memory arrays 520). In an aspect, the amount of available OP space may be determined during production of the DSD and stored in the non-volatile data storage memory. As such, the controller may obtain the amount from the non-volatile data storage memory via an interface (e.g., NVM interface 112 or flash interface module (FIM) 538).

At 604, the controller detects a set of probabilities respectively corresponding to a set of worst-performing jumbo blocks in the non-volatile data storage memory. Each probability in the set of probabilities indicates a likelihood (e.g., via a rank) of a corresponding jumbo block in the set of worst-performing jumbo blocks manifesting a defect. In an aspect, the available OP space stores parity bits corresponding to data written to all wordlines of each jumbo block in the set of worst-performing jumbo blocks. In a further aspect, a number of jumbo blocks in the set of worst-performing jumbo blocks for which parity bits are stored in the available OP space is dependent on the amount of the available OP space.

In an aspect, the set of probabilities respectively corresponding to the set of worst-performing jumbo blocks may be determined during production of the DSD and stored in the non-volatile data storage memory. For example, during a manufacturing self-test (MST) of the DSD, the probabilities of a plurality of jumbo blocks manifesting a defect may be determined based on a failed bit count (FBC)/bit error rate (BER) and/or an average programming time of wordlines of each jumbo block in the plurality of jumbo blocks. Thereafter, the highest determined probabilities may be identified as the set of probabilities corresponding to the worst-performing jumbo blocks and stored in the non-volatile data storage memory. The controller may then obtain the set of probabilities and/or the set of worst-performing jumbo blocks from the non-volatile data storage memory via an interface (e.g., NVM interface 112 or FIM 538).

At 606, the controller writes data to all wordlines of a jumbo block of the non-volatile data storage memory. In an aspect, the jumbo block includes 8 meta-blocks, wherein each meta-block comprises 8 physical blocks and each physical block comprises 96 wordlines. For example, the controller may write the data based on a write request from a host device (e.g., host 102 or host device 500) received via a host interface (e.g., host interface 106 or via a PCIe MAC PHY interface 534). At 608, the controller accumulates, in a volatile data storage memory (e.g., volatile memory/DRAM 110 or DRAM 552), parity bits corresponding to the data written to all wordlines of the jumbo block.

At 610, the controller determines, after the data is written to all wordlines of the jumbo block, a bit error rate (BER) (or failed bit count (FBC)) of the jumbo block and an average programming time of the wordlines in the jumbo block. At 612, the controller calculates a probability of the jumbo block manifesting a defect based on the BER/FBC and the average programming time. At 614, the controller compares the probability to the set of probabilities respectively corresponding to the set of worst-performing jumbo blocks in the non-volatile data storage memory.

At 616, the controller writes the accumulated parity bits from the volatile data storage memory (e.g., volatile memory/DRAM 110 or DRAM 552) to an available over provisioning (OP) space (e.g., OP space 120 or OP space 522) in the non-volatile data storage memory (e.g., NVM array 114 or memory arrays 520) when the probability of the jumbo block is greater than any probability in the set of probabilities. At 618, the controller releases the accumulated parity bits from the volatile data storage memory when the probability of the jumbo block is less than all probabilities in the set of probabilities.

At 620, the controller may optionally update the set of worst-performing jumbo blocks with the jumbo block if the probability of the jumbo block is greater than any probability in the set of probabilities. In an aspect, controller may perform the update by removing, from the set of worst-performing jumbo blocks, a previously existing jumbo block that has a lowest probability in the set of probabilities, and thereafter, adding the jumbo block to the set of worst-performing jumbo blocks.

At 622, the controller may execute an operation, specified by the host device (e.g., read operation), corresponding to the jumbo block and detect, during execution of the host operation, a defect on the jumbo block causing a loss of the data written to the jumbo block. As such, the controller may perform an exclusive-or (XOR) operation based on the accumulated parity bits written to the available OP space to recover the lost data.

Figure 7:
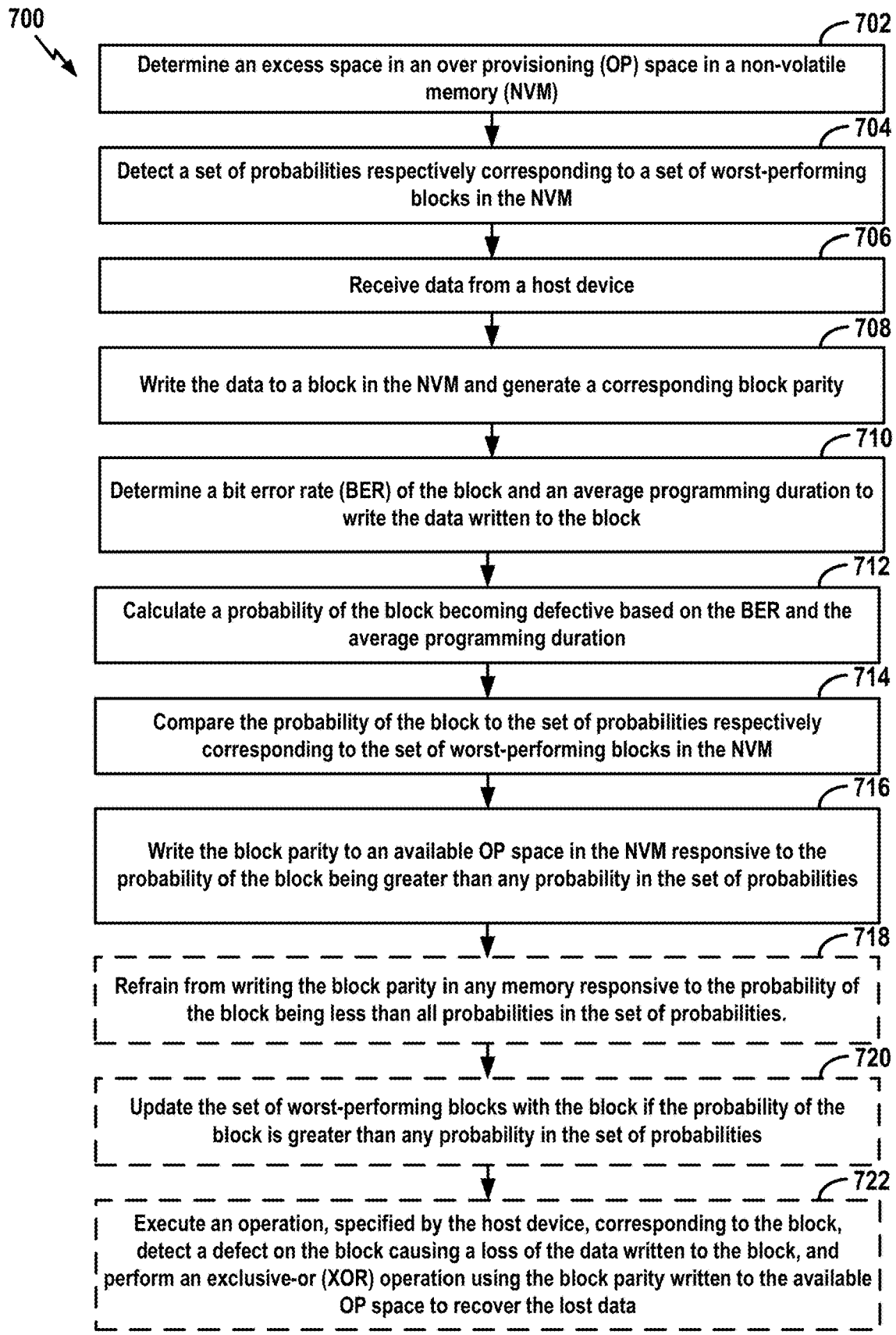
FIG. 7 illustrates another exemplary data recovery procedure that may be performed by a controller of a data storage device (DSD) in accordance with some aspects of the disclosure.

FIG. 7 illustrates another example data recovery procedure 700 that may be performed by a controller of a data storage device (DSD), such as the SSD/DSD controller 108 of FIG. 1, or the NVMe controller 518 of FIG. 5, or any other suitably-equipped device controller. At 702, the controller determines an excess space in an over provisioning (OP) space in a non-volatile memory (NVM) (e.g., NVM array 114 or memory arrays 520). In an aspect, the data storage device may be referred to as a first data storage device. Accordingly, the controller may determine the excess space by determining an average OP space among the first data storage device and a plurality of second data storage devices, and determining that the excess space of the first data storage device is an amount of OP space greater than the average OP space.

At 704, the controller detects a set of probabilities respectively corresponding to a set of worst-performing blocks in the NVM. Each probability in the set of probabilities indicates a likelihood (e.g., via a rank) of a corresponding block in the set of worst-performing blocks manifesting a defect. In an aspect, an available OP space stores parity bits corresponding to data written to blocks in the set of worst-performing blocks. In a further aspect, a number of blocks in the set of worst-performing jumbo blocks for which parity bits are stored in the available OP space is dependent on an amount of the available OP space.

At 706, the controller receives data from a host device (e.g., host 102 or host device 500). At 708, the controller writes the data to a block in the NVM and generates a corresponding block parity. In an aspect, the block parity comprises a full block parity.

At 710, the controller determines a bit error rate (BER) of the block and an average programming duration to write the data written to the block. At 712, the controller calculates a probability of the block becoming defective based on the BER and the average programming duration. At 714, the controller comparing the probability of the block to the set of probabilities respectively corresponding to the set of worst-performing blocks in the NVM.

At 716, the controller writes the block parity to an available OP space in the NVM responsive to the probability of the block being greater than any probability in the set of probabilities. In an aspect, the controller writes the block parity to the available OP space in the NVM responsive to the probability of the block being greater than any probability in the set of probabilities by writing the block parity to the excess space in the OP space.

In an aspect, the writing the data to the block (at 708) may comprise writing the data to all wordlines of the block and the generating the corresponding block parity (at 708) may comprise accumulating, in a volatile memory, parity bits corresponding to the data written to all wordlines of the block. Moreover, the determining the BER of the block and the average programming duration (at 710) may comprise determining the BER of the block and the average programming duration after the data is written to all wordlines of the block. Furthermore, the writing the block parity to the available OP space in the NVM (at 716) may comprise writing the parity bits accumulated in the volatile memory to the available OP space in the NVM.

At 718, the controller may optionally refrain from writing the block parity in any memory responsive to the probability of the block being less than all probabilities in the set of probabilities.

At 720, the controller may optionally update the set of worst-performing blocks with the block if the probability of the block is greater than any probability in the set of probabilities. The controller may perform the update by removing, from the set of worst-performing blocks, a previously existing block that has a lowest probability in the set of probabilities, and adding the block to the set of worst-performing blocks.

At 722, the controller may optionally execute an operation, specified by the host device, corresponding to the block, detect, during execution of the host operation, a defect on the block causing a loss of the data written to the block, and perform an exclusive-or (XOR) operation using the block parity written to the available OP space to recover the lost data.

In some aspects, the procedure 700 described above may optionally include evicting the block parity written to the available OP space in the NVM. For example, if the host device decides to store host data in the OP space for an application (e.g., sends the controller a command to store data in the OP space), the controller may evict the block parity stored (e.g., one or more of the blocks storing parity) in the OP space to make room for the host data. In an aspect, one or more blocks of the block parity may be evicted from the OP space based on a ranking of a corresponding host data block. For example, the controller may first evict from the OP space, the block parity corresponding to the lowest ranked host data block. Accordingly, a balance (or preselected ratio) between reliability (via storing block parity in the OP space) and performance (via storing host data in the OP space) may be maintained in a system.

In the following, various general exemplary procedures and systems are described.

Additional Exemplary Apparatus

Figure 8:
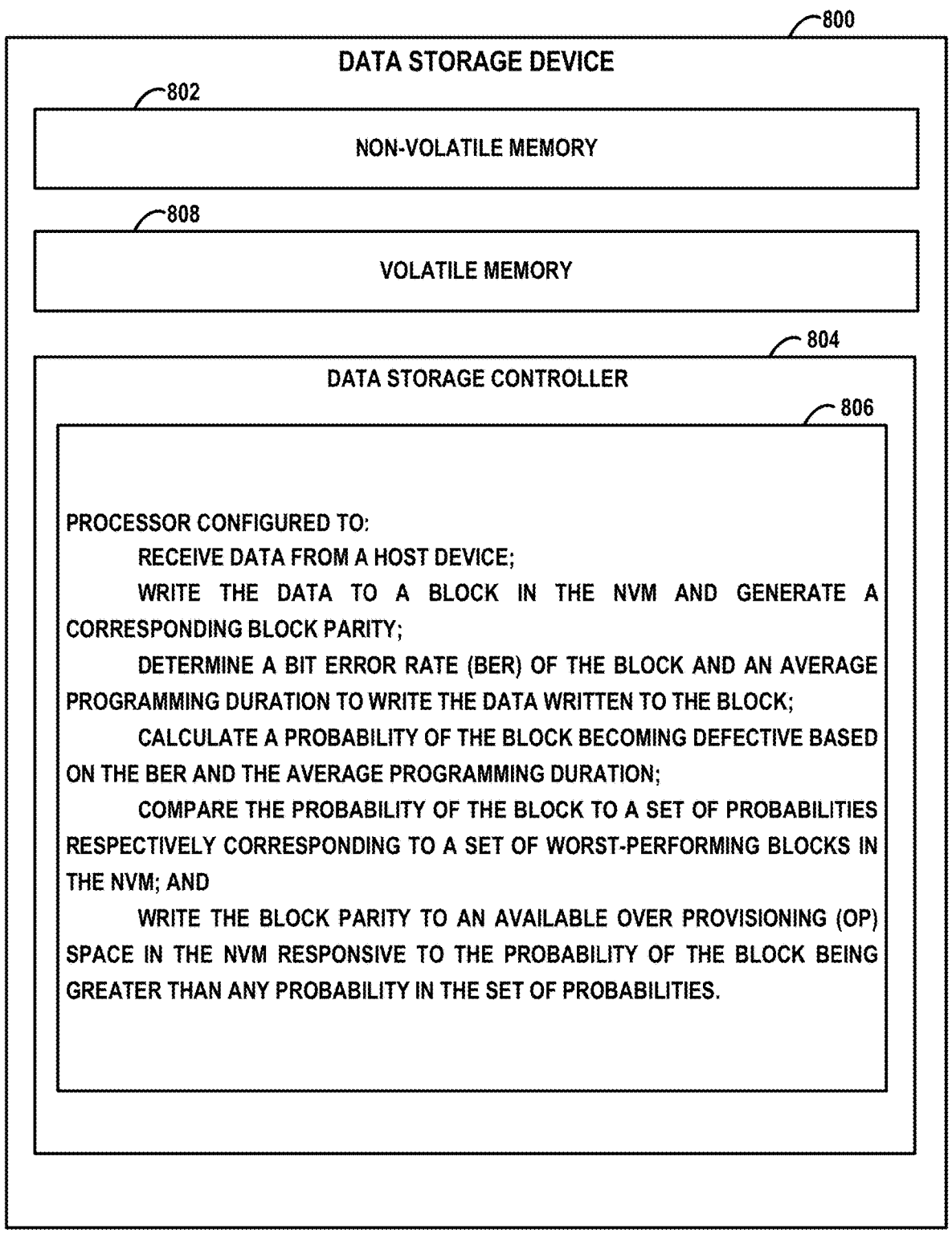
FIG. 8 is a schematic block diagram illustrating an exemplary data storage device configured in accordance with some aspects of the disclosure.

FIG. 8 broadly illustrates a data storage device 800 configured according to one or more aspects of the disclosure. The data storage device 800 includes a non-volatile memory (NVM) 802, a volatile memory 808, and a data storage controller 804. The data storage controller 804 includes a processor or processing circuit 806 configured to receive data from a host device, write the data to a block in the NVM and generate a corresponding block parity, determine a bit error rate (BER) of the block and an average programming duration to write the data written to the block, calculate a probability of the block becoming defective based on the BER and the average programming duration, compare the probability of the block to a set of probabilities respectively corresponding to a set of worst-performing blocks in the NVM 802, and write the block parity to an available over provisioning (OP) space in the NVM 802 responsive to the probability of the block being greater than any probability in the set of probabilities.

The processor 806 may also be configured to determine an excess space in the OP space, determine an average OP space among the data storage device 800 and a plurality of second data storage devices, execute an operation, specified by the host device, corresponding to the block, detect, during execution of the host operation, a defect on the block causing a loss of the data written to the block, perform an exclusive-or (XOR) operation based on the block parity written to the available OP space to recover the lost data, detect the set of probabilities respectively corresponding to the set of worst-performing blocks in the NVM 802, and update the set of worst-performing blocks with the block if the probability of the block is greater than any probability in the set of probabilities.

The processor 806 may further be configured to write data to all wordlines of a jumbo block of the non-volatile memory 802, accumulate, in the volatile memory 808, parity bits corresponding to the data written to all wordlines of the jumbo block, determine, after the data is written to all wordlines of the jumbo block, a bit error rate (BER) of the jumbo block and an average programming time of the wordlines in the jumbo block, calculate a probability of the jumbo block manifesting a defect based on the BER and the average programming time, compare the probability to a set of probabilities respectively corresponding to a set of worst-performing jumbo blocks in the non-volatile memory 802, and write the accumulated parity bits from the volatile memory 808 to an available over provisioning (OP) space in the non-volatile memory 802 when the probability of the jumbo block is greater than any probability in the set of probabilities.

The processor 806 may additionally be configured to detect an amount of the available OP space in the non-volatile memory 802, detect the set of probabilities respectively corresponding to the set of worst-performing jumbo blocks in the non-volatile memory 802, update the set of worst-performing jumbo blocks with the jumbo block if the probability of the jumbo block is greater than any probability in the set of probabilities, and release the accumulated parity bits from the volatile data storage memory 808 when the probability of the jumbo block is less than all probabilities in the set of probabilities. The processor may additionally be configured to execute a host operation corresponding to the jumbo block, detect, during execution of the host operation, a defect on the jumbo block causing a loss of the data written to the jumbo block, and perform an exclusive-or (XOR) operation based on the accumulated parity bits written to the available OP space to recover the lost data.

Figure 9:
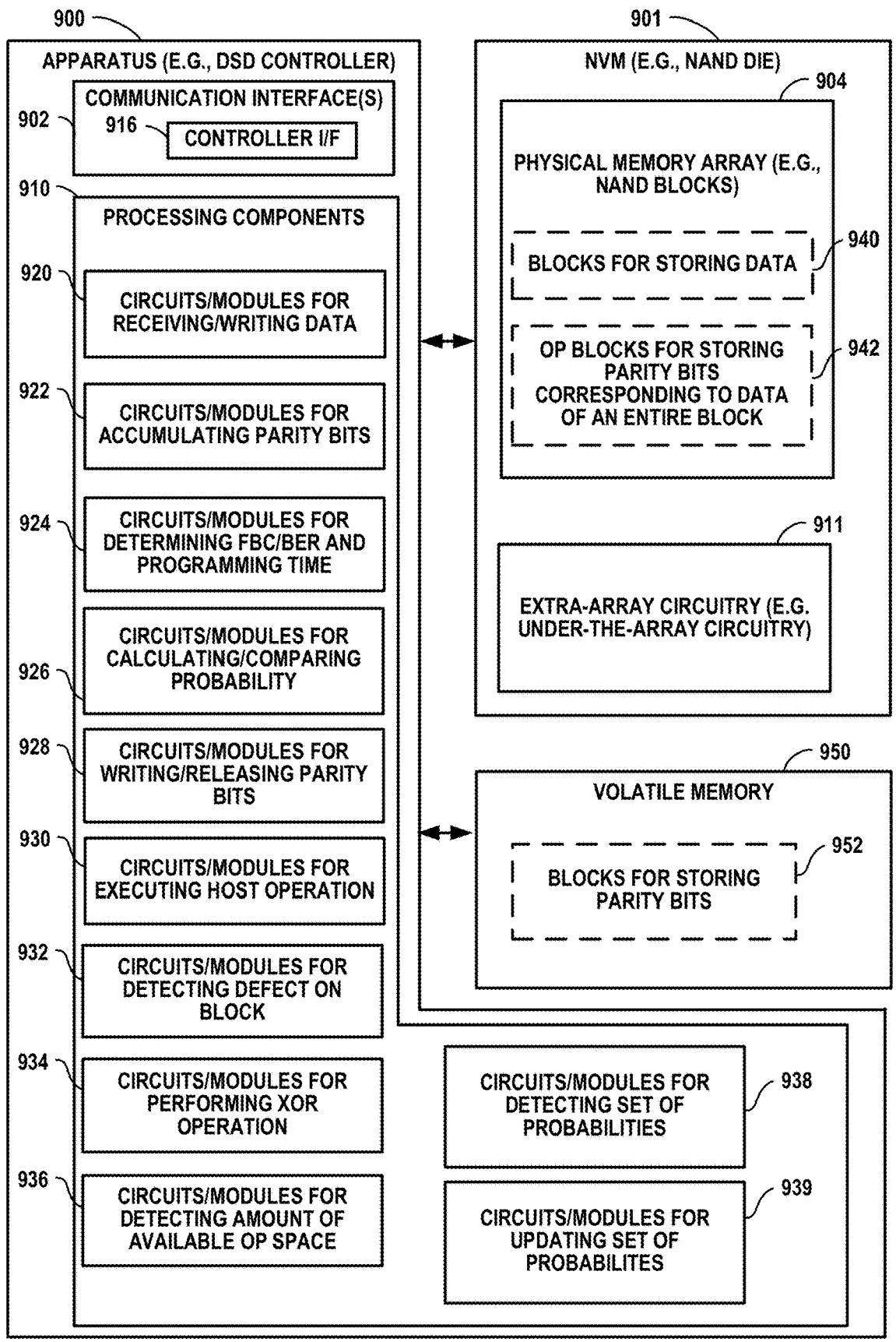
FIG. 9 is a schematic block diagram configuration for an exemplary die and storage controller configured in accordance with some aspects of the disclosure.

FIG. 9 illustrates an embodiment of an apparatus 900 configured according to one or more aspects of the disclosure. The apparatus 900, or components thereof, could embody or be implemented within a data storage controller such as a DSD controller coupled to a volatile memory and a NAND die or some other type of NVM array that supports data storage. In various implementations, the apparatus 900, or components thereof, could be a component of a processor, a controller, a computing device, a personal computer, a portable device, or workstation, a server, a personal digital assistant, a digital camera, a digital phone, an entertainment device, a medical device, a self-driving vehicle control device, an edge device, or any other electronic device that stores, processes or uses neural data.

The apparatus 900 includes a communication interface 902 and is coupled to a NVM 901 (e.g., a NAND die). The NVM 901 includes physical memory array 904 and extra-array processing circuits 911 (e.g. under-the-array or next-to-the-array circuits). The communication interface 902 is further coupled to a volatile memory 950. These components can be coupled to and/or placed in electrical communication with one another via suitable components, represented generally by the connection line in FIG. 9. Although not shown, other circuits such as timing sources, peripherals, voltage regulators, and power management circuits may be provided, which will not be described any further.

The communication interface 802 of the apparatus 900 provides a means for communicating with other apparatuses over a transmission medium. In some implementations, the communication interface 902 includes circuitry and/or programming (e.g., a program) adapted to facilitate the communication of information bi-directionally with respect to one or more devices in a system. In some implementations, the communication interface 902 may be configured for wire-based communication. For example, the communication interface 902 could be a bus interface, a send/receive interface, or some other type of signal interface including circuitry for outputting and/or obtaining signals (e.g., outputting signal from and/or receiving signals into a DSD).

The physical memory array 904 may include one or more NAND blocks. The physical memory array 904 may be coupled to the circuits 911 such that the circuits 911 and/or components of the apparatus 900 and can read or sense information from, and write or program information to, the physical memory array 904. That is, the physical memory array 904 can be coupled to the circuits 911 and/or components of the apparatus 900 so that the physical memory array 904 is accessible by the circuits 911 and/or components of the apparatus 900. For instance, in some examples, the circuits 911 may be on-chip circuits for assessing BER.

The apparatus 900 includes various processing components 910 arranged or configured to obtain, process and/or send data, control data access and storage, issue or respond to commands, and control other desired operations. For example, the components 910 may be implemented as one or more processors, one or more controllers, and/or other structures configured to perform functions. According to one or more aspects of the disclosure, the components 910 may be adapted to perform any or all of the features, processes, functions, operations and/or routines described herein. For example, the components 910 may be configured to perform any of the steps, functions, and/or processes described with respect to FIGS. 1-8. As used herein, the term "adapted" in relation to components 910 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with FIGS. 1-8. The components 910 serve as an example of a means for processing. In various implementations, the components 910 may provide and/or incorporate, at least in part, functionality described above for the components of controller 108 of FIG. 1 or controller 518 of FIG. 5.

According to at least one example of the apparatus 900, the processing components 910 may include one or more of: circuit/modules 920 configured for receiving/writing data; circuits/modules 922 configured for generating/accumulating parity bits; circuits/modules 924 configured for determining failed bit count (FBC)/bit error rate (BER and programming time; circuits/modules 926 configured for calculating/comparing probability; circuits/modules 928 configured for writing/releasing parity bits; circuits/modules 930 configured for executing an operation, specified by a host device; circuits/modules 932 configured for detecting a defect on a block; circuits/modules 934 configured for performing an XOR operation; circuits/modules 936 configured for detecting an amount of available over provisioning (OP) space; circuits/modules 938 configured for detecting a set of probabilities; and circuits/modules 939 configured for updating the set of probabilities.

The physical memory array 904 may include one or more of: blocks 940 for storing data; and OP blocks 942 for storing parity bits corresponding to data of an entire block. The volatile memory 950 may include one or more of block 952 for storing parity bits.

In at least some examples, means may be provided for performing the functions illustrated in FIG. 9 and/or other functions illustrated or described herein. For example, the means may include one or more of: means, such as circuit/module 920, for receiving data from a host device and writing the data to a block in a non-volatile memory (NVM); means, such as circuits/modules 922, configured for generating a corresponding block parity; means, such as circuits/modules 924, for determining a bit error rate (BER) of the block and an average programming duration to write the data written to the block; means, such as circuits/modules 926, for calculating a probability of the block becoming defective based on the BER and the average programming duration and comparing the probability of the block to a set of probabilities respectively corresponding to a set of worst-performing blocks in the NVM; means, such as circuits/modules 928, for writing the block parity to an available over provisioning (OP) space in the NVM responsive to the probability of the block being greater than any probability in the set of probabilities, and for refraining from writing the block parity in any memory responsive to the probability of the block being less than all probabilities in the set of probabilities; circuits/modules 930 configured for executing an operation, specified by a host device, corresponding to the block; means, such as circuits/modules 932, for detecting, during execution of the host operation, a defect on the block causing a loss of the data written to the block; means, such as circuits/modules 934, for performing an exclusive-or (XOR) operation using the block parity written to the available OP space to recover the lost data; means, such as circuits/modules 936, for determining an excess space in the OP space, and for determining an average OP space among a first data storage device and a plurality of second data storage devices; circuits/modules 938 configured for detecting the set of probabilities respectively corresponding to the set of worst-performing blocks in the NVM; and means, such as circuits/modules 939, for updating the set of worst-performing blocks with the block if the probability of the block is greater than any probability in the set of probabilities.

In at least some other examples, means may be provided for performing the functions illustrated in FIG. 9 and/or other functions illustrated or described herein. For example, the means may include one or more of: means, such as circuit/module 920, for writing the data to all wordlines of a jumbo block of the non-volatile data storage memory; means, such as circuits/modules 922, configured for accumulating, in the volatile data storage memory, parity bits corresponding to the data written to all wordlines of the jumbo block; means, such as circuits/modules 924, for determining, after the data is written to all wordlines of the jumbo block, a bit error rate (BER) of the jumbo block and an average programming time of the wordlines in the jumbo block; means, such as circuits/modules 926, for calculating a probability of the jumbo block manifesting a defect based on the BER and the average programming time and comparing the probability to a set of probabilities respectively corresponding to a set of worst-performing jumbo blocks in the non-volatile data storage memory; means, such as circuits/modules 928, for writing the accumulated parity bits from the volatile data storage memory to an available over provisioning (OP) space in the non-volatile data storage memory when the probability of the jumbo block is greater than any probability in the set of probabilities, and releasing the accumulated parity bits from the volatile data storage memory when the probability of the jumbo block is less than all probabilities in the set of probabilities; circuits/modules 930 configured for executing a host operation corresponding to the jumbo block; means, such as circuits/modules 932, for detecting, during execution of the host operation, a defect on the jumbo block causing a loss of the data written to the jumbo block; means, such as circuits/modules 934, for performing an exclusive-or (XOR) operation based on the accumulated parity bits written to the available OP space to recover the lost data; means, such as circuits/modules 936, for detecting an amount of the available OP space in the non-volatile data storage memory; circuits/modules 938 configured for detecting the set of probabilities respectively corresponding to the set of worst-performing jumbo blocks in the non-volatile data storage memory, wherein the available OP space stores parity bits corresponding to data written to all wordlines of each jumbo block in the set of worst-performing jumbo blocks; and means, such as circuits/modules 939, for updating the set of worst-performing jumbo blocks with the jumbo block if the probability of the jumbo block is greater than any probability in the set of probabilities.

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC). Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:
   a non-volatile memory (NVM); and
   a data storage controller configured to:

receive data from a host device,
  write the data to a block in the NVM and generate a corresponding block parity,
  determine a bit error rate (BER) of the block and an average programming duration to write the data written to the block,
  calculate a probability of the block becoming defective based on the BER and the average programming duration,
  compare the probability of the block to a set of probabilities respectively corresponding to a set of worst-performing blocks in the NVM, and
  write the block parity to an available over provisioning (OP) space in the NVM responsive to the probability of the block being greater than any probability in the set of probabilities.

2. The data storage device of claim 1, wherein the data storage controller is further configured to refrain from writing the block parity in any memory responsive to the probability of the block being less than all probabilities in the set of probabilities.

3. The data storage device of claim 1, wherein the data storage controller is further configured to:
  determine an excess space in the OP space; and
  wherein the data storage controller configured to write the block parity to the available OP space in the NVM responsive to the probability of the block being greater than any probability in the set of probabilities is further configured to write the block parity to the excess space in the OP space.

4. The data storage device of claim 3:
  wherein the data storage device is referred to as a first data storage device; the data storage controller further configured to:
  determine an average OP space among the first data storage device and a plurality of second data storage devices; and
  wherein the excess space of the first data storage device comprises an amount of OP space greater than the average OP space.

5. The data storage device of claim 1, wherein the block parity comprises a full block parity.

6. The data storage device of claim 1, wherein the data storage controller is further configured to:
  execute an operation, specified by the host device, corresponding to the block;
  detect, during execution of the host operation, a defect within the block causing a loss of the data written to the block; and
  perform an exclusive-or (XOR) operation using the block parity written to the available OP space to recover the lost data.

7. The data storage device of claim 1, wherein the data storage controller is further configured to:
  detect the set of probabilities respectively corresponding to the set of worst-performing blocks in the NVM,
  wherein the available OP space stores parity bits corresponding to data written to blocks in the set of worst-performing blocks.

8. The data storage device of claim 7, wherein a number of blocks in the set of worst-performing blocks for which parity bits are stored in the available OP space is dependent on an amount of the available OP space.

9. A method for use with a data storage device including a non-volatile memory (NVM), the method comprising:
  receiving data from a host device;
  writing the data to a block in the NVM and generating a corresponding block parity;
  determining a bit error rate (BER) of the block and an average programming duration to write the data written to the block;
  calculating a probability of the block becoming defective based on the BER and the average programming duration;
  comparing the probability of the block to a set of probabilities respectively corresponding to a set of worst-performing blocks in the NVM; and
  writing the block parity to an available over provisioning (OP) space in the NVM responsive to the probability of the block being greater than any probability in the set of probabilities.

10. The method of claim 9, further comprising refraining from writing the block parity in any memory responsive to the probability of the block being less than each of the probabilities in the set of probabilities.

11. The method of claim 9, further comprising:
  determining an excess space in the OP space; and
  wherein the writing the block parity to the available OP space in the NVM responsive to the probability of the block being greater than any probability in the set of probabilities comprises writing the block parity to the excess space in the OP space.

12. The method of claim 11:
  wherein the data storage device is referred to as a first data storage device; the method further comprising:
  determining an average OP space among the first data storage device and a plurality of second data storage devices; and
  wherein the excess space of the first data storage device comprises an amount of OP space greater than the average OP space.

13. The method of claim 9, wherein the block parity comprises a full block parity.

14. The method of claim 9, further comprising:
  executing an operation, specified by the host device, corresponding to the block;
  detecting, during execution of the host operation, a defect within the block causing a loss of the data written to the block; and
  performing an exclusive-or (XOR) operation using the block parity written to the available OP space to recover the lost data.

15. The method of claim 9, further comprising:
  detecting the set of probabilities respectively corresponding to the set of worst-performing blocks in the NVM,
  wherein the available OP space stores parity bits corresponding to data written to blocks in the set of worst-performing blocks.

16. The method of claim 9, further comprising:
  updating the set of worst-performing blocks with the block if the probability of the block is greater than any probability in the set of probabilities.

17. The method of claim 16, wherein the updating comprises:
  removing, from the set of worst-performing blocks, a previously existing block that has a lowest probability in the set of probabilities; and
  adding the block to the set of worst-performing blocks.

18. The method of claim 9, wherein:
  the writing the data to the block comprises writing the data to all wordlines of the block;

the generating the corresponding block parity comprises accumulating, in a volatile memory, parity bits corresponding to the data written to all wordlines of the block;

the determining the BER of the block and the average programming duration comprises determining the BER of the block and the average programming duration after the data is written to all wordlines of the block; and the writing the block parity to the available OP space in the NVM comprises writing the parity bits accumulated in the volatile memory to the available OP space in the NVM.

19. An apparatus for use with a non-volatile memory (NVM), the apparatus comprising:

means for receiving data from a host device;

means for writing the data to a block in the NVM and generating a corresponding block parity;

means for determining a bit error rate (BER) of the block and an average programming duration to write the data written to the block;

means for calculating a probability of the block becoming defective based on the BER and the average programming duration;

means for comparing the probability of the block to a set of probabilities respectively corresponding to a set of worst-performing blocks in the NVM; and means for writing the block parity to an available over provisioning (OP) space in the NVM responsive to the probability of the block being greater than any probability in the set of probabilities.

20. The apparatus of claim 19, further comprising:

means for executing an operation, specified by the host device, corresponding to the block;

means for detecting, during execution of the host operation, a defect within the block causing a loss of the data written to the block; and means for performing an exclusive-or (XOR) operation using the block parity written to the available OP space to recover the lost data.

* * * * *